UNITED STATES PATENT OFFICE.

W. BENTLEY WOODBURY, OF MANCHESTER, ENGLAND.

MODE OF PRINTING PHOTOGRAPHS.

Specification forming part of Letters Patent No. 52,803, dated February 20, 1866.

*To all whom it may concern:*

Be it known that I, W. B. WOODBURY, of Manchester, county of Lancaster, in the Kingdom of Great Britain and Ireland, have invented a Mode of Producing Surfaces in Intaglio and Rilievo; and I do hereby declare the following to be a full, clear, and exact description of the same.

The invention is designed for the purpose of producing surfaces in rilievo and intaglio—relief and depression—upon aluminous materials, such as porcelain or other semi-transparent materials, so that when viewed as a transparency the varying thicknesses in the material will show the picture or design; or for the purpose of producing rilievo or intaglio in any plastic or fusible materials, so as to have the appearance of a bas-relief or intaglio, and the invention is particularly useful in producing copies of such articles.

The improvements consist in producing, first, a mold consisting of graduated thicknesses of material, which are obtained or rendered from and are a transcript of the light and shadows in a photographic negative. This first mold, when procured, is to be electrotyped—*i. e.*, covered by a metallic deposit—by ordinary means, and from such metallic mold or pattern so produced castings may be obtained in any fusible or plastic material. I would remark that the principle of producing a first mold having varying thicknesses obtained from or rendered by the lights and shadows of a photographic negative constitutes the chief feature of this part of the invention, which being accomplished, the formation of copies or reverses therefrom in any material becomes simple. I will therefore proceed to describe one method of obtaining such first mold.

A solution of gelatine and sugar, in proportion of about one part of sugar to eight parts of gelatine, is to be dissolved and clarified with albumen (white of eggs) and then filtered. When required for use add to every ounce of the above a solution in water of ten grains of bichromate of ammonia, and when these two solutions have combined and are nearly cool spread them on a sheet of clean glass to the thickness of about one-eighth of an inch and place away for five or six hours to cool and solidify, in which state cut the film or coating into pieces and strip the pieces from the glass. The polished side of the solidified film or coating which has been in contact with the glass must now be laid on the negative, excluding all air-bubbles. The negative with the gelatine attached must then be placed in the focus of the condenser of a solar camera or other condenser of the rays, by the use of which the lines in the negative are produced as clearly at the back of the gelatine as the front, the yellow color of the bichromatized gelatine not allowing the rays to penetrate too far; or another mode of operating upon the mixture of gelatine and bichromate may be adopted, and in some cases will be found preferable. The mixture may be spread to the depth of a sixteenth or an eighth of an inch on pieces of talc lightly secured onto a plate of glass, and when the gelatine is sufficiently set the talc and gelatine may be stripped from the glass and the talc side placed in contact with the photographic negative, through which negative sunlight is caused to pass in nearly parallel rays by means of a condensing-lens, the negative being placed at a distance of from eighteen to twenty-four inches beyond the focus of the said lens, or the solution of gelatine and bichromate may be thoroughly dried in a desiccating-box and used in a dried state without the talc. When the solidified gelatine shall have been sufficiently exposed—say in from half an hour to an hour—which may be known by the back of the gelatine being slightly depressed in the high lights of the negative, the gelatine should be lifted from the negative and fastened by india-rubber cement to a piece of stout card coated with lac-varnish and held under a stream of hot water until the parts not acted upon are washed away; or when talc is used the talc holding the gelatinous coating must be placed in warm water to dissolve the soluble portions. An image is thus produced in which the lights are depressed and the shadows raised. The gelatine must then be allowed to get surface-dry, and in cases where talc is employed, as above described, the talc to which it is attached should be secured to a plate of glass of somewhat larger dimensions and retained in its position by strips of copper passing around the edges, to one of which strips a copper wire is to be attached. The surface of the gelatine is then to be brushed over or otherwise coated with bronze-powder, plumbago, or silver precipitated in metallic form. It may then be subjected to the process of electrotyping by placing it in a solution of sulphate of copper, the wire then being connected to an ordinary electrotyping-battery, where it is allowed to remain until it becomes coated with copper to the thickness of about the sixteenth of an inch or more. When the copper coating is removed from the gelatine the mold is obtained, which may then be mounted in lead or gutta-percha (which latter I prefer) and used for the purpose of printing or making impressions on paper or other material by the use of the aforesaid intaglio-mold. It is to be mounted in gutta-percha and placed, intaglio surface upward, on the bed of an ordinary letter-press or other suitable press. A small quantity of semi-transparent ink made of gelatine and any coloring-matter is to be poured onto the center of the mold, and the paper or material to be impressed, having been previously extended on a plate of glass or other hard smooth surface on the upper part of the press, is to be brought into contact therewith and subjected to sufficient pressure to expel the surplus color from the edges of the mold. When this has been removed the pressure may be taken off and a correct copy or print of the article or design originally photographed will be found printed in slight relief on the paper.

The use of the semi-transparent inks surmounts a great difficulty existing in all previous attempts at similar descriptions of printing, as by using opaque inks the slightest depressions in the mold give the same depth of color or shade as the deeper impressions.

I would also remark that if ceramic colors are employed the impressions may be made and burned into porcelain or ceramic wares to ornament the same.

By casting or otherwise taking a metallic reverse of the copper mold previously prepared from a design drawn on paper a stamp and matrix may be obtained for embossing paper or other material; or the matrix may be used as a seal for impressing wax.

When the process is employed for the purpose of obtaining copies of medals, bas-reliefs, &c., a cast from the object must be made in a solid semi-transparent material, such as white wax, and by photographing the same by light transmitted through the casting a negative may be obtained which, when treated as hereinbefore described, will produce a miniature copy of the original. To produce a bas-relief or intaglio I take a solution of any transparent color in water of such a strength that at three or four inches deep it may be opaque, and let the bas-relief lie in this, so that by photographing this a negative is obtained in which the prominent parts are the lightest and the farthest parts the darkest. By printing from this negative a mold in gelatine will be the result, from which a casting taken in plaster or fusible material will be a copy of the original.

I claim as my invention and desire to secure by Letters Patent—

The use, in connection with the plate herein described, or with any engraved plate, of semi-transparent or partially-transparent inks, substantially in the manner and for the purpose specified.

In testimony whereof I have signed my name to this specification in the presence of two subscribing witnesses.

W. B. WOODBURY.

Witnesses:
JNO. L. DAVIES,
THOS. WRIGLEY.